April 21, 1964

E. HAIN 3,129,506

TRANSFER ARM FOR AUTOMATIC TOOL CHANGING SYSTEMS

Filed July 2, 1962

INVENTOR.
EDWARD HAIN
BY
Brown, Jackson, Boettcher & Dienner
ATTYS.

April 21, 1964    E. HAIN    3,129,506
TRANSFER ARM FOR AUTOMATIC TOOL CHANGING SYSTEMS
Filed July 2, 1962    4 Sheets-Sheet 3

INVENTOR.
EDWARD HAIN
ATTYS.

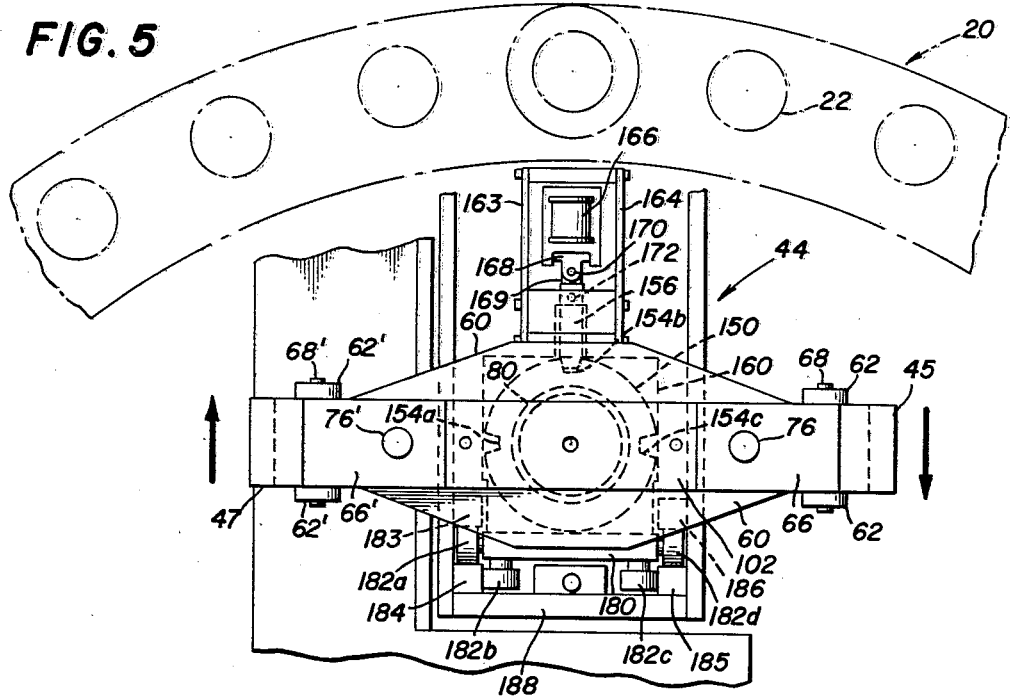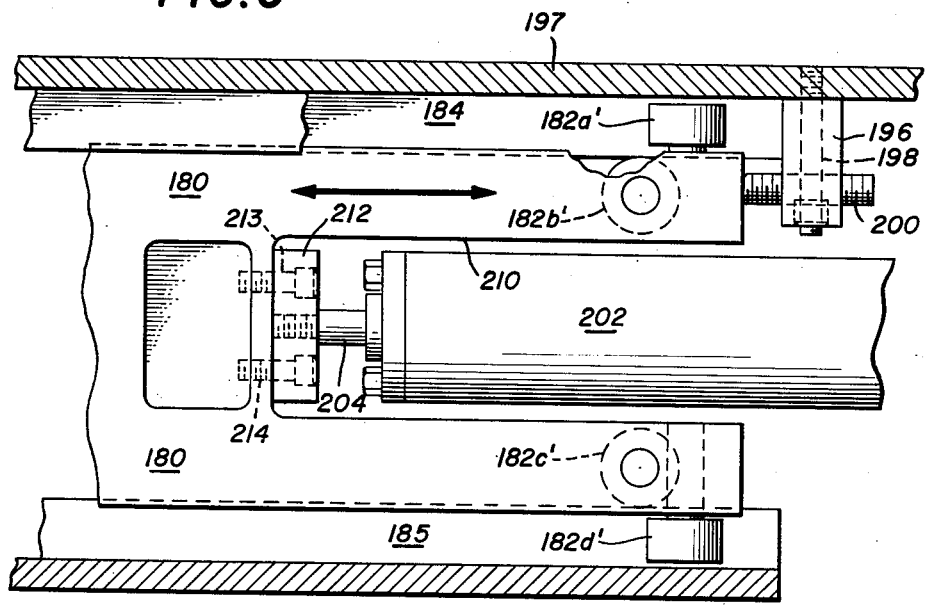

United States Patent Office 3,129,506
Patented Apr. 21, 1964

3,129,506
TRANSFER ARM FOR AUTOMATIC TOOL
CHANGING SYSTEMS
Edward Hain, Chicago, Ill., assignor to Scully-Anthony Corporation, La Grange, Ill., a corporation of Illinois
Filed July 2, 1962, Ser. No. 206,938
13 Claims. (Cl. 29—568)

The present invention relates to automatic tool changing apparatus of a type adapted to be employed in conjunction with a machine tool for automatically transferring a plurality of tools seriatim from a storage area to a spindle or work station and for subsequently returning them to the storage area. This invention relates to a transfer arm especially adapted for use in automatic tool changing systems, particularly where data controlled machine tools are employed.

More specifically, the present invention relates to a new and improved rotatable transfer arm having gripper means at each of its ends equally spaced from the axis of rotation of the arm. The two gripper means are actuated simultaneously to open or closed positions and are adapted to cooperate with gripping flanges or the like provided on the tools or tool holders which are to be transferred to and from a machine tool spindle or work station.

Various types of transfer arms have previously been proposed for use in automatic tool changing systems, some of which are rotatable and provided with gripping means at each of the two ends of the arm. However, in such known devices the gripping means at the ends of the arm are adapted to grip a tool or tool holder around the periphery thereof in order to transfer the tool from one position to another. In other words, gripping pressure is applied radially with respect to the axis of the tool. Such gripping members commonly comprise a pair of clamping jaws which wrap around a portion of the shank or periphery of a tool holder so as to exert a radial clamping force thereon.

The various tool transfer means heretofore known, wherein a gripping member closes about the periphery of a tool holder, impose several undesirable limitations regarding the versatility of operation of an automatic tool changing system. Thus, where a gripping member must move radially toward the shank of a tool holder and present a pair of open arms or jaws adapted to encompass the holder, it will be readily apparent that the gripper cannot pass through a tool position when the position is occupied by a tool.

Another limitation imposed by such known types of transfer arms and associated gripping means is that the open jaws on the gripper must approach the tool holder from a given direction in order to permit the gripping jaws to encompass a portion of the tool holder. For example, if a rotatable transfer arm is provided at one of its ends with a pair of gripping jaws adapted to wrap around the periphery of a tool holder when the transfer arm is rotated to bring the jaws into gripping position, then it is necessary to rotate the transfer arm in a given direction so that the open portion of the gripper will be properly oriented with respect to the tool holder as it approaches the latter. In addition, once such a gripper is brought into gripping position relative to a tool holder through rotation of the transfer arm, the transfer arm must then be stopped, since the tool holder will be disposed in the path of the gripping jaws so as to prevent further rotation of the transfer arm.

Another form of gripping means which has heretofore been provided on a rotatable transfer arm comprises gripping jaws adapted to encompass or wrap about the periphery of a tool holder through linear movement in a radial direction. Such transfer arms are relatively complex since in addition to providing mechanism for rotating the arm, it is also necessary to mount the transfer arm itself on rails or on a pivotable arm, or provide other suitable mechanisms so that in addition to rotation of the arm, it can also be moved linearly in a radial direction relative to a tool holder.

A further disadvantage of known devices of the type above-mentioned relates to the transfer or handing off of a tool from one gripping means to another. Thus, if a first gripping device is engaged about the periphery of a tool holder, and the holder is to be transferred to a second gripping device, the latter must engage about the tool at a position axially spaced from the position of the first gripping means. Accordingly, if it is desired to transfer a tool from one gripping device to an identical gripper which will assume the same axial position relative to the tool as the first gripper, it is necessary to provide an intermediate gripping member to hand the tool from the first to the second gripper.

It is an object of the present invention to provide a transfer arm having mounted at each of its ends gripping means which are adapted to apply gripping pressure to a tool holder in a direction generally parallel to the axis of the holder.

Another object of the invention is to provide a rotatable transfer arm having gripping means on the end thereof disposed in such a manner that the arm may be rotated so as to cause the gripping means to pass through a tool position even when the position is occupied by a tool.

A further object is to provide a transfer arm which is mounted on a fixed axis and which is adapted to remove an old tool from a machine tool spindle and transfer a new tool thereto through rotational and axial movement relative to said fixed axis.

A still further object of the invention is to provide a rotatable transfer arm having gripping means on each end which means are adapted to be moved into gripping position relative to a tool holder disposed adjacent the arcuate path of movement of the gripping means upon rotation of said transfer arm in either direction.

Another object is to provide a transfer arm having a gripping member at each end thereof and having actuator means for opening the two gripper members simultaneously and for closing the gripper members simultaneously.

Still another object of the invention is to provide a transfer arm having gripper members at each end thereof and having novel mechanism for opening and closing the gripper members, for moving the transfer arm axially, and for rotating the transfer arm.

An additional object is to provide a transfer arm having compensating mechanism to permit adjustment of the position of the arm when a tool to be transferred is slightly misaligned with respect to gripping means provided on the arm.

Other objects, uses and advantages of the invention will become apparent, or be obvious, from the following specification, particularly when considered in connection with the drawings in which.

Figure 3:
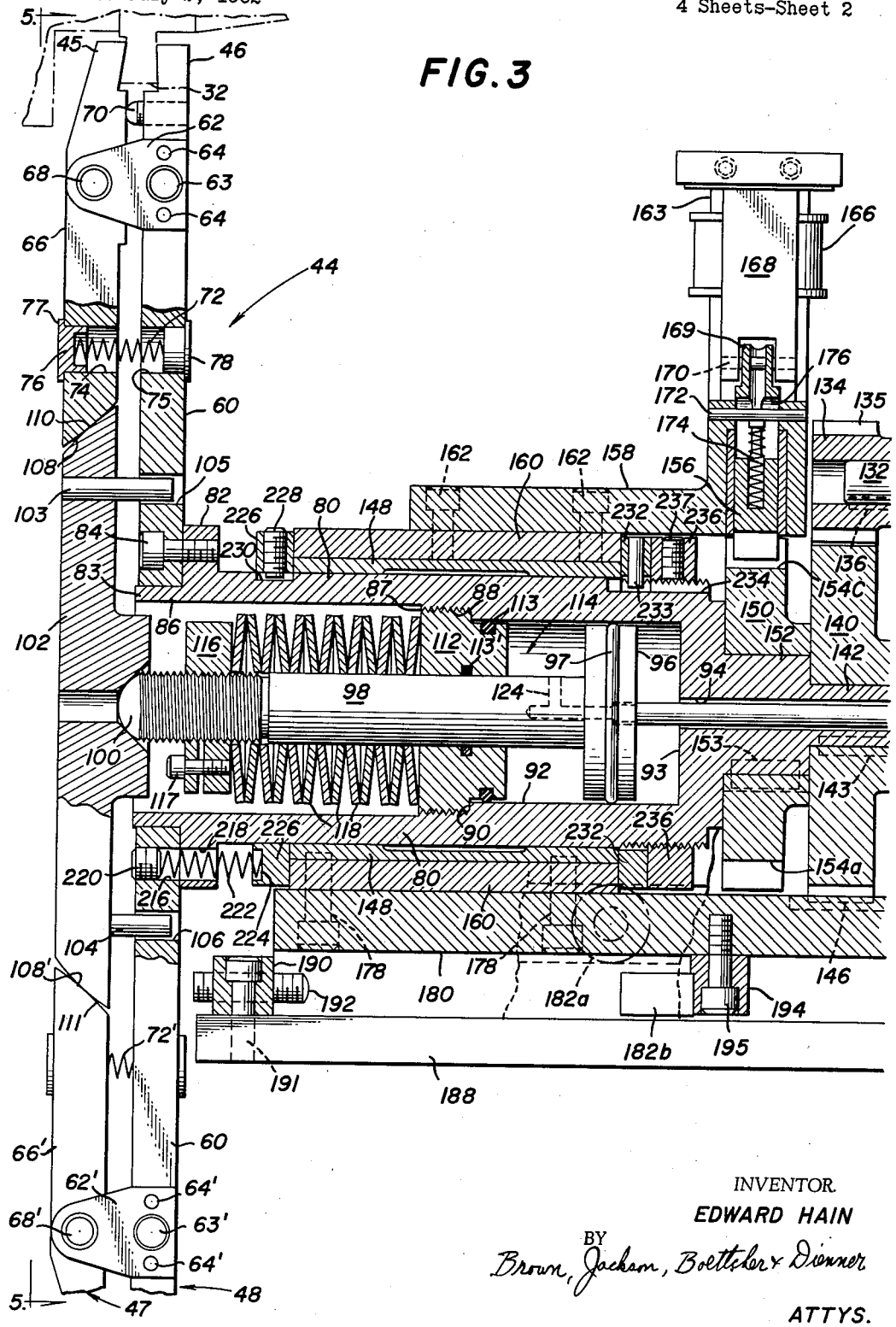
Figure 4:
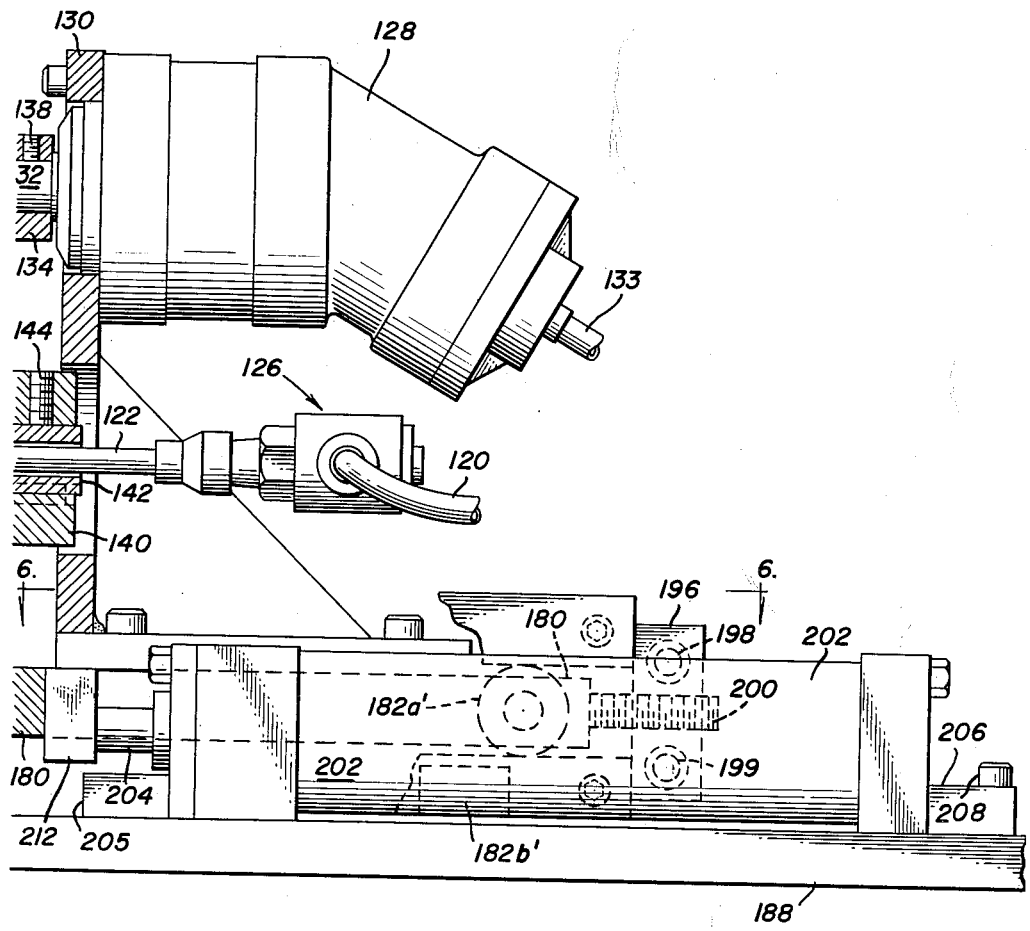

FIGURES 3 and 4, when arranged side by side and viewed together, comprise a side elevational view, partly in section and partly broken away, showing the transfer arm and associated mechanism for controlling the axial and rotational movement of the arm and for opening and closing gripper members provided at the two ends thereof;

FIGURE 5 is a reduced front elevational view, taken substantially along the line 5—5 of FIGURE 3, showing the transfer arm in a horizontal neutral position, and showing in dash-dot lines a fragmentary portion of a matrix or tool storage member; and FIGURE 6 is a partial horizontal section taken substantially along the line 6—6 of FIGURE 4.

It should be understood that when reference is made herein or in the appended claims to a "tool holder," such term should be interpreted to include tools, tool holders, and work pieces, since it will be readily apparent that flange gripping portions or the like which are formed on a tool holder to cooperate with a gripper member, may, if desired, be formed directly on a tool or on a work piece which is to be transferred from one position to another.

Figures 1, 2:
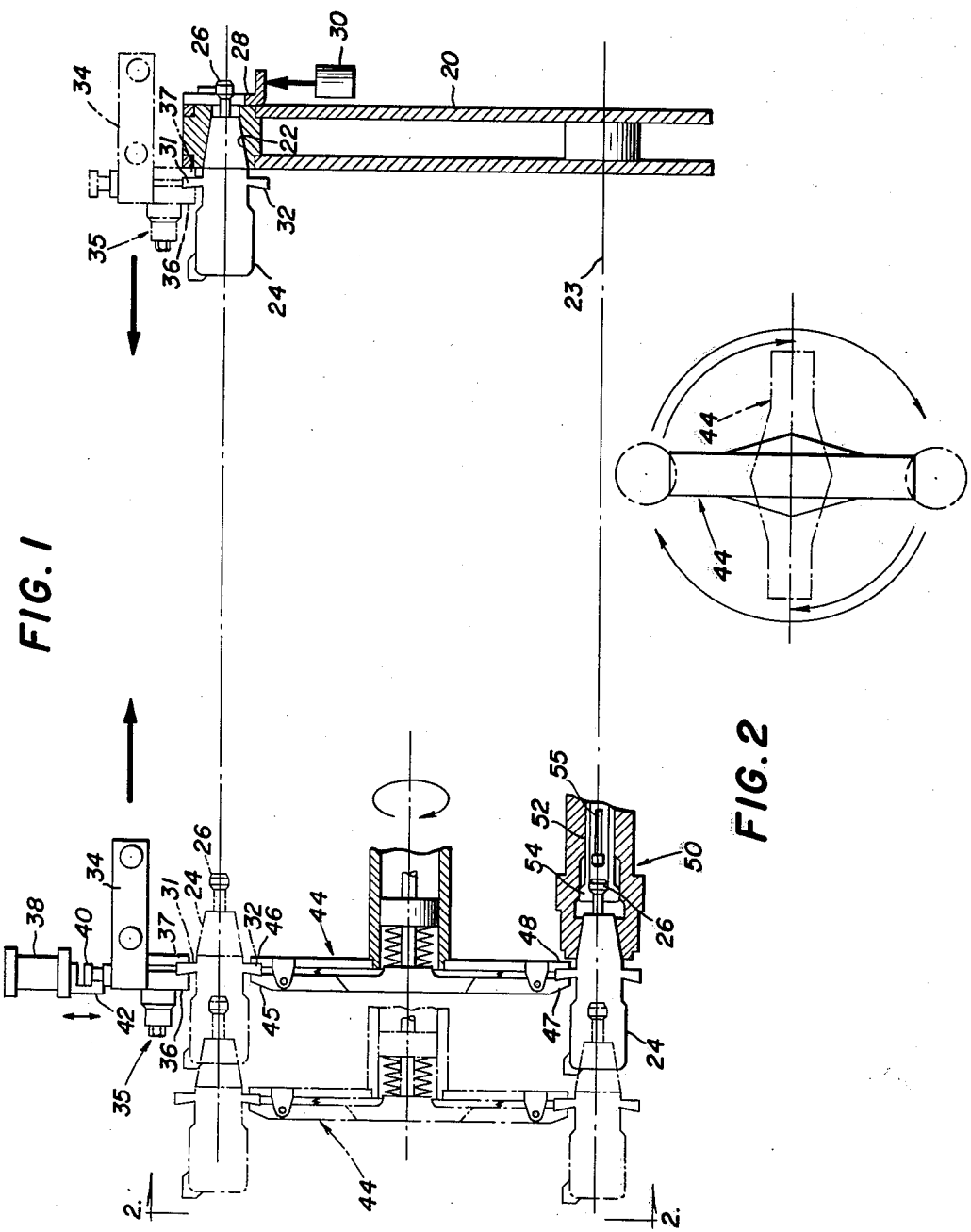
FIGURE 1 is a generally schematic side elevational view of an automatic tool changing system illustrating, by way of example, one suitable application of the transfer arm of the present invention.
FIGURE 2 is a generally schematic front elevational view of a transfer arm taken substantially along the line 2—2 of FIGURE 1 and showing by way of example one suitable sequence of operations, and transfer arm being shown in solid lines in a vertical position to effect gripping of a pair of tool holders, and in dash-dot lines in a neutral horizontal position.

It is believed that the following general description of the tool changing system represented schematically in FIGURE 1 will facilitate an understanding of the operation and advantages of the transfer arm of the present invention. There is shown in FIGURE 1 a fragmentary portion of a matrix or tool storage member 20, which may for example be a large circular disc-shaped member having a plurality of circumferentially spaced sockets as at 22. The matrix 20 may be rotatable about a horizontal axis 23 so as to position any one of the sockets 22 in a predetermined position for insertion or removal of a tool.

A tool holder 24 having a knob 26 projecting from its rear end is shown mounted in a socket 22 and held therein by a spring-actuated latch member 28 which engages the knob and locks the tool holder in position. A solenoid is represented at 30 for actuating the latch to release the tool holder. It will be understood that a large number of tools may be stored in the matrix 20 for removal therefrom as needed. The tool holder 24 is provided with an upper flange portion 31 and an oppositely disposed lower flange portion 32, and a movable shuttle member 34 is provided with a gripper 35 comprising jaws 36 and 37, the latter being shown clamped on the opposite faces of the upper flange portion 31. The tool holder 24 is fully described in the copending application of Myron L. Anthony and Bernard R. Better, Serial No. 178,060, filed March 7, 1962, and assigned to the assignee of the present invention.

The shuttle 34 is shown in dash-dot lines in its extreme right hand position, and is shown in its extreme left hand position in solid lines, the shuttle being movable from one of said positions to the other along a track or guide by a chain drive or other suitable drive means (not shown). A double acting cylinder 38 is provided for raising and lowering the gripping member 35 of the shuttle when the latter is in its extreme left hand position where a lug 40 on the gripping member 35 is engaged by a hook 42 provided at the lower end of a piston which is reciprocable with the cylinder 38. The gripping member 35 is moved upwardly and downwardly within the shuttle 34 in a guideway (not shown).

In accordance with the present invention, there is provided a transfer arm 44 which is shown somewhat schematically in its right hand position in solid lines and in its left hand position in dash-dot lines, the arm being movable axially through a short stroke, and also being rotatable about its horizontal axis. The transfer arm 44 is provided with a gripper member at each of its ends, one such gripper member comprising jaws 45 and 46, and the other comprising jaws 47 and 48. Mechanism for operating the transfer arm 44 will be fully described hereinafter.

A spindle of a machine tool is indicated generally at 50, and collet means for holding a tool in the spindle is shown at 52, the collet means comprising a plurality of gripping fingers 54 adapted to engage the knob 26 upon movement of the fingers axially rearwardly by collet actuating means (not shown). An ejector rod 55 is axially movable with the fingers 54, whereby when the fingers are moved forwardly to release a tool holder 24, the rod 55 will butt the rear face of the knob 26 and aid in the removal of the tool holder from the spindle.

By way of example, a sequence of operations for the tool changing system represented in FIGURE 1 will now be described. It will be assumed that a tool 24 is in the spindle 50, and that it is desired to return this tool to the matrix 20 and to transport another tool from the matrix to the spindle for a further machining operation. It will also be assumed that the shuttle 34 is in its extreme right hand position with the shuttle jaws 36 and 37 open. Thus, the matrix 20 is indexed or rotated until a selected tool or tool holder is positioned with its flange portion 31 disposed between the open shuttle jaws 36 and 37, after which the matrix is stopped. The foregoing operation may be controlled by automatic mechanism which does not form a part of the present invention, and thus will not be described herein.

Once the selected tool is positioned with its flange portion 31 disposed between the shuttle jaws 36 and 37, the shuttle jaws are closed and the tool is released in the matrix by actuation of the solenoid 30, after which the shuttle 34 is moved to its extreme left hand position. Latch mechanism which is particularly adapted for holding a tool in a storage magazine such as the matrix 20 is fully described in the copending application of Harry R. Dziedzic and Edward M. Alisauskis, Serial No. 197,745, filed May 25, 1962 and assigned to the assignee of the present invention.

During the foregoing operations the transfer arm 44 will normally be in a neutral position, i.e., it will be in its right hand position and will be rotated 90 degrees from the vertical position shown in FIGURE 1 to the position shown in dash-dot lines in FIGURE 2 so as to extend substantially horizontally. If desired, the neutral position may be other than horizontal, as long as it is rotated sufficiently from the position of FIGURE 1 to avoid interference with a tool which is being brought forward by the shuttle 34. It will thus be seen that a tool is selected from the matrix 20 and held by the shuttle at an intermediate station from which it may be transported to the spindle 50 by the transfer arm 44.

The operations thus far described may be performed while a tool in the spindle 50 is engaged in a machining operation, in which case the new tool is simply held at the intermediate station by the shuttle jaws 36 and 37 until the spindle is stopped. If a tool or tool holder is provided with a pair of distinct flange gripping areas such as at 31 and 32, rather than a continuous flange, then it will be necessary to provide registering means for stopping the spindle 50 so that the flange portions on the tool holder mounted therein will be disposed vertically. Such registering means, however, form no part of the present invention. It should be understood that when terms such as "horizontal" and "vertical" are used herein, reference is had to the embodiment shown in FIGURE 1 wherein a horizontal spindle is employed. Such terms should not be interpreted in a limiting sense since the invention may be utilized in other embodiments, for example where a vertical spindle is utilized.

With the shuttle 34 in its left hand position with a newly selected tool gripped in its jaws, and with the spindle 50 stopped, the transfer arm jaws 45, 46, 47 and 48 are opened and the transfer arm 44 is rotated from its neutral position to a vertical position wherein the jaws 45 and 46 will encompass the lowermost flange portion 32 on the newly selected tool, and the jaws 47 and 48 will encompass the uppermost flange portion on the tool which is disposed in the spindle, after which the transfer arm jaws are closed. The shuttle jaws 36 and 37 are then opened, and the shuttle gripping member 35 is raised by the cylinder 38.

It will be understood that the purpose of raising the shuttle gripper 35 by the double acting cylinder 38 is to move the shuttle gripper away from the upper flange portion on the tool holder being gripped by the transfer arm jaws 45 and 46, whereby the transfer arm 44 may be moved axially to the left without interference with the shuttle jaws 36 and 37. Accordingly, it will be apparent and other shuttle gripper motions may be employed to accomplish the foregoing purpose. For example, the shuttle gripper 35 may be hingedly associated with the shuttle 34. In the latter instance, the gripper 35 may be pivoted out of the position shown in FIGURE 1 to permit axial movement of the transfer arm 44 after receiving a tool from the shuttle.

Once the gripping member 35 has been moved upwardly, the collet 52 is actuated to release the tool in the spindle 50, and the transfer arm 44 is moved axially to the left an amount sufficient to remove the old tool from the spindle, the ejector rod 55 aiding in the ejection of the old tool by being moved to the left to butt against the knob 26 thereon. The transfer arm 44 is then rotated 180 degrees and returned to its right hand position whereby the newly selected tool is inserted in the spindle 50, after which the collet 52 is closed, the gripping member 35 of the shuttle 34 is lowered, and the shuttle jaws 36 and 37 are closed about the upper flange portion on the tool which has been removed from the spindle.

Having thus inserted a new tool in the spindle 50 and removed the old tool therefrom, the transfer arm jaws 45, 46, 47 and 48 are opened, and the transfer arm 44 is rotated from its vertical position to a neutral position. The shuttle 34 is then moved back to its right hand position so as to return the old tool to an empty socket 22 in the matrix 20, the tool being automatically locked therein by latch 28. The shuttle jaws 36 and 37 are then opened, after which the matrix may be indexed to search for the next tool to be transferred to the spindle.

The transfer arm 44 of the present invention will now be described, and for this purpose reference is made to FIGURES 3 and 4 which taken together show the transfer arm and associated mechanism partly in side elevation and partly in section. The transfer arm 44 comprises an arm or base portion 60 which has formed at one end the gripping jaw 46 and which has formed at its opposite end the gripping jaw 48, the latter being partly broken away in FIGURE 3 but being substantially identical to the jaw 46.

As viewed in FIGURE 3, the upper end of the arm 60 has a bracket 62 fixedly secured thereto by a screw 63 and a pair of dowel pins 64. Preferably, a similar bracket is secured to the opposite side of the arm 60 as shown in FIGURE 5. A clamp member 66 is pivotally mounted on the end of the bracket 62 by a pin 68, the clamp being generally parallel to the adjacent end of the arm 60 but being adapted to rotate about the pin 68 between open and closed positions. The radially outer end of the clamp 66 comprises the jaw 45 which is adapted to cooperate with the jaw 46 in order to grip therebetween a projecting flange or the like such as the flange 32 on the tool holder 24. In order to grip such a flange the clamp 66 is rotated in a clockwise direction as viewed in FIGURE 3 about the pin 68, and in order to release a member being held between the jaws 45 and 46 the clamp is rotated in a counterclockwise direction.

A stop pin 70 is threaded into the arm 60 between the bracket 62 and the jaw 46 and projects toward the clamp 66 so as to limit the clockwise movement of the clamp and thus prevent the jaws 45 and 46 from engaging each other in the event the jaws are closed without a tool holder flange or the like disposed therebetween.

The opposite end of the transfer arm 44, i.e., the lower end in FIGURE 3, is substantially identical to the upper end described above. Thus, there is provided a bracket 62' which is secured to the arm 60 by a screw 63' and a pair of dowel pins 64', and there is provided a clamp member 66' which is pivotally mounted on the bracket 62' by a pivot pin 68'. On the radially outer end of the clamp 66' there is formed the jaw 47 which is adapted to cooperate with the jaw 48 which is formed on the adjacent end of the arm 60, gripping being effected as described above with respect to the gripper jaws 45 and 46.

The clamp members 66 and 66' are adapted to be moved to their open positions by a pair of tension springs 72 and 72', respectively. The clamp 66 is provided with a bore 74 which is in alignment with a bore 75 provided in the arm 60. An anchor cap 76 is positioned in the bore 74 and has an overhanging peripheral lip portion 77 which anchors the cap with respect to the clamp 66. A similar cap 78 is mounted in the bore 75 of the arm 60. The tension spring 72 has one end secured to each of the caps 76 and 78 and thereby serves to bias the clamp 66 in a counterclockwise direction about the pin 68 toward its open position. The tension spring 72' is mounted in a similar fashion between the clamp 66' and the adjacent end of the arm 60 and serves to bias the clamp 66' toward its open position.

A shaft 80 is provided at its axially outer end with a radially projecting peripheral flange 82, and immediately outwardly of the flange 82 there is formed an integral hub or end portion 83 of reduced diameter. The arm 60 has a central bore of a diameter slightly larger than the hub or end portion of the shaft 80 whereby the arm 60 is mounted on the end 83 of the shaft and secured to the flange 82 by a plurality of cap screws such as the one shown at 84. The shaft 80 is provided with an axial bore 86 which extends from the forward end thereof to an annular shoulder 87, and a threaded bore 88 of slightly reduced diameter extends rearwardly from the shoulder 87 to a shoulder 90. A bore 92 extends from the shoulder 90 to a base portion 93, and a relatively small diameter hole 94 extends from the base portion 93 rearwardly through the remaining length of the shaft.

A piston 96 is positioned within the bore 92 for axial sliding movement therein, an O-ring 97 being provided to effect a seal between the piston and the shaft 80. A piston rod 98 is integral with the piston 96 and extends forwardly therefrom approximately to the forward end of the shaft 80. A rounded nose portion 100 on the end of the rod 98 is adapted to cooperate with an actuator 102. The actuator 102 is supported from the arm 60 by a pair of guide pins 103 and 104 which are fixed to the actuator and extend into corresponding holes 105 and 106 formed in the arm 60. The radially inner ends of the clamp members 66 and 66' are inclined at approximately 45 degrees as at 108 and 108', and the radially outer ends of the actuator are similarly inclined as at 110 and 111.

It will now be understood that upon movement of the piston rod 98 forwardly within the shaft 80, the nose portion 100 moves the actuator 102 forwardly, the latter being freely slidable axially relative to the arm 60 from which it is supported, and upon such forward movement of the actuator the clamps 66 and 66' are simultaneously moved to closed positions. Upon a rearward axial movement of the piston 96, the clamps 66 and 66' are simultaneously moved to open positions by the tension springs 72 and 72'.

A nut 112 is threaded into the portion 88 of the shaft 80 so as to seat against the peripheral shoulder 90, and an O-ring 113 produces a seal between the nut 112 and the shaft so as to form a sealed chamber 114 between the nut and the piston 96. An O-ring 113' produces a seal between the nut 112 and the rod 98. A lock nut 116 is threaded on the outer end of the piston rod 98 and secured in position thereon by a set screw 117, and a plurality of Belleville spring washers 118 are mounted in series on the rod 98 between the lock nut 116 and the nut 112. It will be seen that the spring washers comprise compression spring means which serve to yieldingly urge the rod 98 axially outwardly and thereby urge the clamps 66 and 66' toward their closed positions. In this respect, it should be noted that the tension springs 72 and 72' are of a relatively small size and are readily overcome by the force produced by the spring washers 118.

Fluid pressure means are utilized for moving the piston 96 rearwardly to permit the clamps 66 and 66' to be opened by the tension springs 72 and 72'. Fluid under pressure is conducted into a conduit 120 and passed through a tube 122 which projects through the hole 94 in the rear end of the shaft 80 and extends into the piston 96 so as to connect with a conduit 124 which communicates with the chamber 114. The conduit 120 and tube 122 are connected by a conventional rotary couple 126. When fluid under pressure is thus conducted into the chamber 114, the piston 96 is moved rearwardly within the shaft 80 so as to overcome the force of the spring washers 118 and permit the clamps 66 and 66' to be opened.

The mechanism for rotating the transfer arm 44 will now be described. A hydraulic motor 128 is mounted on a supporting frame 130, and a motor shaft 132 associated therewith is driven by fluid under pressure which is conducted into a fluid inlet 133. A pinion 134 having external teeth 135 is mounted on the shaft 132 and keyed thereto by a key 136, a set screw 138 also being provided to secure the pinion to the shaft. A spur gear 140 is mounted on a reduced diameter end portion 142 of the shaft 80 and keyed thereto by key means 143. A set screw 144 is utilized to secure the spur gear to the shaft 80. The spur gear 140 has external teeth 146 formed thereon which mesh with the teeth 135 formed on the pinion 134 whereby the shaft 80 is adapted to be rotated by the hydraulic motor 128, as will be more fully described hereinafter.

The shaft 80 is rotatably mounted within a bushing 148, and the rotation of the shaft is controlled by indexing means comprising an index wheel 150 (see FIGURES 3 and 5) which is mounted on a section 152 of the shaft and keyed thereto by key means 153. FIGURE 5 shows three notches 154a, 154b and 154c which are formed in the index wheel 150 for cooperation with a vertically disposed stop finger 156. In the embodiment being described, the transfer arm 44 is rotated in a clockwise direction as viewed in FIGURE 5, and it is positioned substantially horizontal when in its neutral position. The notches 154a and 154c are oppositely disposed, and the notch 154b which corresponds to the neutral position is disposed 90 degrees therefrom.

When the hydraulic motor 128 is operating in forward drive, it is constantly urging the shaft 80 and the transfer arm 44 in a clockwise direction as viewed in FIGURE 5. When the stop finger 156 is seated within one of the notches in the index wheel 150, the shaft 80 is prevented from rotating and the motor stalls. However, as soon as the stop finger 156 is lifted, the transfer arm 44 will be rotated until the stop finger drops into the next notch in the index wheel.

Referring now to the mechanism for actuating the stop finger 156, there is provided a frame 158 which is secured to a housing block 160 by a plurality of cap screws 162. The frame 158 includes a pair of upright supports 163 and 164, between which there is mounted a solenoid 166 having a plunger 168 which is connected to an upper-end 169 of the stop finger by a pin 170. A pin 172 is fixedly mounted in the supporting frame 158, and a compression spring 174 is positioned between the fixed pin 172 and the stop finger 156 so as to urge the latter downwardly. A vertical slot 176 is formed in the stop finger to permit it to move vertically relative to the fixed pin 172.

In operation, the solenoid 166 is momentarily energized to lift the stop finger 156 out of the notch 154 in which it is seated, whereupon the index wheel 150 rotates along with the shaft 80 and the transfer arm 44, and upon release of the solenoid the stop finger rides along the surface of the index wheel until it is moved into the next notch 154 by the compression spring 174, at which time the motor 128 is stalled and the transfer arm stops.

The mechanism for moving the transfer arm 44 axially will now be described. The shaft 80 rotates within the bushing 148 which is pressed into a large diameter bore in the housing block 160. The housing block 160 is substantially square in cross section (see FIGURE 5), and is fixedly secured by a plurality of cap screws 178 to a carriage 180 which comprises a generally flat plate. The front end of the carriage 180 carries four guide rollers 182a, 182b, 182c and 182d (see FIGURE 5), two of which are rotatable about vertical axes, and two of which are rotatable about horizontal axes. The rear end of the carriage 180 is provided with a similar set of guide rollers which are shown in FIGURE 6 and indicated with corresponding primed numerals. The rollers are adapted to ride along fixed guide rails such as the rails 183, 184, 185 and 186. The carriage 180 is thus adapted to be rolled forwardly and rearwardly along the guide rails in order to move the transfer arm 44 through a short axial stroke between the two positions indicated in FIGURE 1.

Adjustable stop means are provided to limit the movement of the carriage 180 and thereby control the stroke of the transfer arm 44. A fixed frame 188 has a stop block 190 secured to its upper surface at the forward end thereof by a cap screw 191, and an adjustable horizontally disposed stop pin 192 is threaded into the fixed stop block 190 for engagement with a stop block 194 which is secured to the underside of the carriage 180 by a cap screw 195. FIGURES 3 and 4 show the carriage 180 in its rearward position, and it will be understood that the carriage may be moved forwardly until the carriage stop block 194 engages the adjustable stop pin 192.

Similar stop means are provided for limiting the rearward travel of the carriage 180, and there is shown a stop block 196 (see FIGURES 4 and 6) which is secured to a fixed side plate 197 by a pair of cap screws 198 and 199. An adjustable stop pin 200 is threaded into the fixed stop block 196, and with the carriage 180 in its rearward position as shown in FIGURES 3, 4 and 6 it will be seen that the rear end of the carriage is in engagement with the pin 200.

FIGURES 4 and 6 show a cylinder 202 and a piston rod 204 which are utilized to move the carriage 180 forwardly and rearwardly. The cylinder 202 is provided with integral lugs 205 and 206 at its respective ends and is secured to the fixed frame 188 by a plurality of cap screws such as the one shown at 208 in FIGURE 4. The cylinder 202 is positioned with its forward end disposed within a large recess 210 formed in the rear of the carriage 180, and the forward end of the piston rod 204 is threaded into a bracket 212 which is secured to the carriage 180 by a pair of cap screws 213 and 214. It will now be understood that the carriage 180 is moved forwardly and rearwardly by conducting fluid under pressure to the cylinder 202.

A further feature of the present invention comprises compensating means for permitting a small amount of axial movement of the transfer arm 44 and shaft 80 relative to the housing 160. FIGURE 3 shows an aperture 216 which is formed in the arm 60 in alignment with a corresponding aperture 218 formed in the flange 82 on the shaft 80. The hole 216 is tapped and a plug 220 is threaded into the outer end thereof to support one end of a compression spring 222, the other end of the spring being received in a recess 224 provided therefor in a ring 226 which is mounted over the shaft 80 so as to bear against the forward end of the housing block 160. A set screw 228 is threaded in the ring 226 and the end of the set screw projects into a slot or keyway 230 formed in the shaft 80. In this manner, the ring 226 is prevented from rotating on the shaft 80, but relative axial movement between the two is permitted.

In the embodiment being described herein, six compression springs of the type shown at 222 are mounted between the arm 69 and the ring 226 in circumferentially spaced relation, and such springs serve to yieldingly urge the shaft 80 and transfer arm 44 axially forwardly relative to the housing block 160.

Adjacent the rear of the housing block 160, a washer 232 is mounted on the shaft 80 so as to bear against the rear face of the housing block, and a pin 233 which projects into a keyway 234 in the shaft 80 serves to prevent relative rotation between the shaft and the washer. A nut 236 is threaded on the shaft 80 so as to bear against the washer 232, and is held in position by a set screw 237. It will be noted that the washer 232 and nut 236 prevent the shaft 80 from being moved forwardly relative to the housing 160 from the position shown in FIGURES 3 and 4. However, the shaft 80 and all components mounted thereon, including the transfer arm 44, can be moved rearwardly a limited amount relative to the housing block 160 upon application of a rearward axial force sufficient to overcome the six compression springs 222.

Since the shaft 80 is adapted to rotate relative to the housing 160, there would be a tendency for the nut 236 to be unscrewed from the shaft if the nut were to engage the housing. It is to prevent such an occurrence that the washer 232 is provided and is made to rotate with the shaft 80 by the pin 233. With the latter arrangement, there is no torque applied to the nut 236 during rotation of the shaft 80.

The foregoing structure for permitting rearward movement of the transfer arm 44 upon application of a force sufficient to overcome the six compression springs 222 is to provide for compensation during removal of a tool holder 24 from the spindle 50. As described hereinabove in conjunction with FIGURE 1, the transfer arm 44 is rotated from a neutral position to a vertical position in order to permit one of the gripping means such as the gripper comprising the jaws 47 and 48 to encompass a flange which projects upwardly from a tool holder held in the spindle. In order to permit the gripping of a tool holder 24 in the spindle in the manner described, it is necessary that the grippers on the transfer arm 44 be in alignment with the flange on the tool holder. However, it is not possible to maintain perfect alignment between these members at all times.

The compensating mechanism is adapted to eliminate the foregoing problem, since in those instances where a tool holder 24 which is to be removed from the spindle 50, is disposed so that the flange or gripping portion thereon is positioned slightly rearwardly of the gripper on the transfer arm, the gripper jaws on the end of the transfer arm will engage the flange on the tool holder and the transfer arm will be cammed rearwardly so as to permit the gripper to encompass the flange. A slight lead in angle is provided on the transfer arm grippers to facilitate such a camming or shifting operation.

Having in mind the sequence of operations described earlier herein in conjunction with FIGURE 1, the operation of the transfer arm 44, when used in an automatic tool changing system of the type there shown, will now be briefly described. It will be assumed that the shuttle 34 has selected a new tool from the matrix 20, that the shuttle has been moved to its forward position as shown in solid lines in FIGURE 1, and that the spindle 50 with an old tool therein has been stopped.

At such a time the transfer arm 44 will be in a neutral or horizontal position as shown in FIGURE 5, and will be disposed in its rearward axial position so as to be in alignment with the two tool holders in the spindle and in the shuttle. In addition, fluid under pressure will be conducted through the conduit 122 to the chamber 114 so as to hold the piston 96 in its rearward axial position and thereby permit the jaws 45 and 46 and the jaws 47 and 48 to be held open by the tension springs 72 and 72', respectively.

In order to rotate the transfer arm 44 to a vertical position, the solenoid 166 is energized to lift the stop finger 156 out of the notch 154b in the index wheel 150, whereby the transfer arm will be rotated in a clockwise direction (as viewed in FIGURE 5) by the hydraulic motor 128 until the finger 156 engages in the notch 154a, thus stopping the transfer arm in a vertical position with the jaws 47 and 48 encompassing a flange on the tool holder being held in the shuttle 34, and the jaws 45 and 46 encompassing a flange on the tool holder mounted in the spindle 50. The pressure in the chamber 114 is then released and the spring washers 118 cause the rod 98 and actuator 102 to be moved forwardly so as to close the clamping members 66 and 66' and cause the grippers at the two ends of the transfer arm to grip the tool holder flanges positioned therein. The shuttle jaws 36 and 37 are then opened, and the shuttle gripping member 35 is raised by the cylinder 38.

The next step in the tool changing cycle being described is to open the collet 52 to release the tool holder in the spindle 50, after which fluid under pressure is applied to the cylinder 202 through a conduit (not shown) so as to move the piston rod 204 forwardly and thereby roll the carriage 180 forwardly until the stop 194 engages the stop pin 192. In this manner, the transfer arm 44 is moved forwardly through a short axial stroke to a position such as shown in dash-dot lines in FIGURE 1. During this operation the old tool is removed from the spindle 50.

The solenoid 166 is again energized to lift the stop finger 156 from the notch 154a in the index wheel 150, whereby the transfer arm 44 is rotated 180 degrees in a clockwise direction (as viewed in FIGURE 5) by the hydraulic motor 128 until the finger 156 seats in the notch 154c. In this manner, the transfer arm is stopped in a vertical position with the old tool being held at the upper end of the arm in the jaws 45 and 46 and the new tool being held at the lower end of the arm in the jaws 47 and 48.

Fluid under pressure is next conducted through an appropriate conduit (not shown) to the cylinder 202 to cause the rod 204 to be moved rearwardly and thereby roll the carriage 180 rearwardly until the end thereof engages the stop pin 200. In this manner, the transfer arm 44 is moved rearwardly to the position shown in solid lines in FIGURE 1 so as to insert the new tool in the spindle 50. The collet 52 is then closed, the gripping member 35 of the shuttle 34 is lowered, and the shuttle jaws 36 and 37 are closed about the upper flange portion on the tool which has been removed from the spindle 50.

Having thus inserted a new tool in the spindle 50 and removed the old tool therefrom, fluid under pressure is conducted through the conduit 122 to the chamber 114 to move the piston 96 to its rearward axial position and permit the jaws 45 and 46 and the jaws 47 and 48 to be opened by the corresponding tension springs 72 and 72'. The solenoid 166 is then energized to lift the stop finger 156 from the notch 154c in the index wheel 150, whereby the transfer arm is again rotated in a clockwise direction by the hydraulic motor 128 until the finger 156 engages in the notch 154b, at which time the transfer arm will be in its horizontal neutral position as shown in FIGURE 5. The shuttle 34 may then be returned to its right hand position in FIGURE 1 to return the old tool to an empty socket 22 in the matrix 20.

It will now be understood that the transfer arm 44 of the present invention is adapted to carry out a tool changing operation through only two basic movements, namely, axial movement of the arm, and rotation of the arm about its axis.

The hydraulic motor 128 is preferably of the type having two fluid inlets, one for forward drive and one for reverse drive, and it will be noted that the transfer arm 44 may be rotated in either direction from a neutral position in order to effect simultaneous gripping of a tool in the shuttle 34 and a tool in the spindle 50. Furthermore, by appropriately controlling the indexing mechanism, the transfer arm can be rotated through any desired angle without interference with a tool held in the shuttle 34 or a tool in the spindle 50, as long as the gripper members at each end of the arm are open.

A plurality of shuttles 34 may be utilized to bring tools forward from the matrix 20 and hold them in an intermediate position, and the transfer arm 44 may be rotated through a number of tool positions and selectively stopped at a particular tool which it is desired to transfer to the spindle 50.

It will be understood that the particular sequence of operations described hereinabove with respect to the transfer arm of the present invention is merely for purposes of illustration, and that the transfer arm is adapted for numerous and varied useful applications in conjunction with automatic tool changing systems. Thus, while certain preferred forms of my invention have been described and illustrated, it will be appreciated that modifications and changes may be made therein by those skilled in the art, particularly with my disclosure before them, and thus I do not intend to be limited to the particular disclosure, except insofar as the appended claims are so limited.

I claim:

1. For use in an automatic tool changing system for transferring tools or the like from one position to another, a transfer arm having a gripping member at each end thereof, said transfer arm being rotatable about a transverse axis midway between said gripping members, each of said gripping members comprising a pair of jaws adapted to be closed to grip a portion of a tool holder therebetween, and an actuator for producing relative movement between said jaws in a direction generally parallel to said transverse axis to effect gripping and release of a tool holder, said actuator being movable in one axial direction to simultaneously effect the closing of both of said pairs of jaws and being movable in the opposite direction to simultaneously effect the opening of both of said pairs of jaws.

2. The invention of claim 1 wherein compression spring means is provided for biasing said actuator in said one axial direction and fluid pressure means is provided for overcoming said spring means to effect movement of said actuator in said opposite direction.

3. For use in an automatic tool changing system for transferring tools or the like from one position to another, a transfer arm comprising a rotatable arm member having an integral gripping jaw formed at each end thereof, said arm member being rotatable about a transverse axis midway between said jaws, a pair of clamp members, one clamp member being pivotally associated with each end of said rotatable arm and each clamp member having a movable jaw adapted to cooperate with a corresponding one of said integral jaws for gripping a portion of a tool holder therebetween, each clamp member being pivotable to move the jaw thereon in a direction generally parallel to said transverse axis between closed and open positions relative to a corresponding integral jaw to effect gripping and release of a tool holder, and an actuator operatively associated with both of said clamp members, said actuator being movable in one axial direction to simultaneously effect the pivotal movement of both of said clamp members to closed positions and being movable in the opposite direction to simultaneously effect the pivotal movement of both of said clamp members to open positions.

4. The invention of claim 3 wherein spring means are provided for urging said clamp members toward their open positions whereby when said actuator is moved in said one axial direction it engages said clamp members and overcomes said spring means to move said clamp members to their closed positions and when said actuator is moved in said opposite direction it permits said spring means to move said clamp members to their open positions.

5. For use in an automatic tool changing system for transferring tools or the like from one position to another, a transfer arm comprising a rotatable arm member having an integral gripping jaw formed at each end thereof, said arm member being rotatable about a transverse axis midway between said jaws, a pair of clamp members, one clamp member being pivotally associated with each end of said rotatable arm and each clamp member having a movable jaw adapted to cooperate with a corresponding one of said integral jaws for gripping a portion of a tool holder therebetween, each clamp member being pivotable to move the jaw thereon in a direction generally parallel to said transverse axis between closed and open positions relative to a corresponding integral jaw to effect gripping and release of a tool holder, spring means for urging said clamp members toward their open positions, and an actuator supported from said rotatable arm member and disposed with its radially outer ends adapted to engage the radially inner ends of said clamp members, respectively, said actuator being movable in one axial direction to engage the radially inner ends of said clamp members and overcome said spring means to simultaneously effect the pivotal movement of both of said clamp members to closed positions and being movable in the opposite direction to permit said spring means to simultaneously effect the pivotal movement of both of said clamp members to open positions.

6. The invention of claim 5 wherein said actuator is supported from said rotatable arm member by guide means which is fixed to said actuator and projects into a corresponding opening in said arm member whereby said actuator is freely slidable axially relative to said arm member.

7. The invention of claim 6 wherein compression spring means is provided for biasing said actuator in said one axial direction and fluid pressure means is provided for overcoming said compression spring means to effect movement of said actuator in said opposite direction.

8. For use in an automatic tool changing system for transferring tools or the like from one position to another, a transfer arm assembly comprising a transfer arm having a gripping member at each end thereof, said arm being rotatable about a fixed transverse axis midway between said gripping members, each of said gripping members comprising a pair of jaws adapted to be closed to grip a portion of a tool holder therebetween, actuating means for producing relative movement between said jaws in a direction generally parallel to said transverse axis to effect gripping and release of a tool holder, means for rotating said transfer arm about said fixed transverse axis, and means for moving said transfer arm forwardly and rearwardly along said fixed axis.

9. The invention of claim 8 wherein a hydraulic motor is provided for rotating said transfer arm about said transverse axis and wherein indexing means is provided for controlling the angle of rotation of said transfer arm.

10. For use in an automatic tool changing system for transferring tools or the like from one position to another, a transfer arm assembly comprising a carriage movable axially between forward and rearward positions, a housing fixedly mounted on said carriage, a shaft rotatable within said housing, a transfer arm having a gripping member at each end thereof, said arm being secured to said shaft for rotation therewith about a fixed transverse axis midway between said gripping members, each of said gripping members comprising a pair of jaws adapted to be closed to grip a portion of a tool holder therebetween, actuating means for producing relative movement between said jaws in a direction generally parallel to said transverse axis to effect gripping and release of a tool holder, means for rotating said shaft, and means for moving said carriage forwardly and rearwardly.

11. For use in an automatic tool changing system for transferring tools or the like from one position to another, a transfer arm assembly comprising a carriage movable axially between forward and rearward positions, a housing fixedly mounted on said carriage, a shaft rotatable within said housing, a transfer arm having a gripping member at each end thereof, said arm being secured to said shaft for rotation therewith about a fixed transverse axis midway between said gripping members, each of said gripping members comprising a pair of jaws adapted to be closed to grip a portion of a tool holder therebetween, actuating means for producing relative movement between said jaws in a direction generally parallel to said transverse axis to effect gripping and release of a tool holder, a hydraulic motor for rotating said shaft, indexing means operatively associated with said shaft for controlling the angle of rotation thereof, and means for moving said carriage forwardly and rearwardly.

12. For use in an automatic tool changing system for transferring tools or the like from one position to another, a transfer arm having a gripping member at each end thereof, said arm being rotatable about a transverse axis midway between said gripping members, each of said gripping members comprising a pair of jaws adapted to be closed to grip a portion of a tool holder therebetween, actuating means for producing relative movement between said jaws in a direction generally parallel to said transverse axis to effect gripping and release of a tool holder, and compensating means for permitting limited rearward movement of said transfer arm along said transverse axis where necessary to provide alignment with a tool to be gripped, said compensating means including yieldable means normally urging said transfer arm forwardly.

13. For use in an automatic tool changing system for transferring tools or the like from one position to another, a transfer arm assembly comprising a carriage movable axially between forward and rearward positions, a housing fixedly mounted on said carriage, a shaft rotatable within said housing and movable a limited distance axially relative to said housing, yieldable means biasing said shaft forwardly relative to said housing, a transfer arm having a gripping member at each end thereof, said arm being secured to said shaft for rotation about a fixed transverse axis midway between said gripping members, each of said gripping members comprising a pair of jaws adapted to be closed to grip a portion of a tool holder therebetween, actuating means for producing relative movement between said jaws in a direction generally parallel to said transverse axis to effect gripping and release of a tool holder, means for rotating said shaft, and means for moving said carriage forwardly and rearwardly.

No references cited.